United States Patent
King et al.

(10) Patent No.: US 6,647,659 B1
(45) Date of Patent: Nov. 18, 2003

(54) FISHING LURE

(75) Inventors: Alan King, Southaven, MS (US); Mark Thornton, Cordova, TN (US)

(73) Assignee: Trinity Takle Technologies, Inc., Cordova, TN (US)

( * ) Notice: Subject to any disclaimer, the term of this patent is extended or adjusted under 35 U.S.C. 154(b) by 0 days.

(21) Appl. No.: 10/029,452

(22) Filed: Dec. 18, 2001

Related U.S. Application Data (60) Provisional application No. 60/256,785, filed on Dec. 19, 2000.

(51) Int. Cl.$^7$ ................................................ A01K 85/01
(52) U.S. Cl. ........................................................ 43/17.6
(58) Field of Search .................................. 43/17.6, 17.5

(56) References Cited

U.S. PATENT DOCUMENTS

| | | | | |
|---|---|---|---|---|
| 4,114,305 A | * | 9/1978 | Wohlert et al. ................ | 310/15 |
| 4,175,348 A | * | 11/1979 | Ray .......................... | 335/205 |
| 4,347,681 A | | 9/1982 | Fima .......................... | 43/17.6 |
| 4,536,985 A | | 8/1985 | Caviness .................... | 43/17.6 |
| 4,669,213 A | | 6/1987 | LeRoy ........................ | 43/17.6 |
| 4,819,361 A | * | 4/1989 | Boharski .................... | 43/17.6 |
| 4,959,919 A | * | 10/1990 | Rao et al. .................... | 43/17.6 |
| 5,157,857 A | | 10/1992 | Livingston .................. | 43/17.6 |
| 5,159,773 A | | 11/1992 | Gentry et al. ................ | 43/17.1 |
| 5,286,244 A | * | 2/1994 | Wright et al. ................ | 116/202 |
| 5,330,282 A | | 7/1994 | Rodgers ..................... | 43/17.6 |
| 5,461,815 A | | 10/1995 | Rodgers ..................... | 43/17.6 |
| 5,697,182 A | | 12/1997 | Rodgers ..................... | 43/17.6 |
| 5,758,450 A | | 6/1998 | Young ........................ | 43/17.6 |
| 5,987,802 A | | 11/1999 | Caprio ....................... | 43/17.5 |
| 6,029,388 A | | 2/2000 | Yokogawa et al. .......... | 43/17.6 |
| 6,030,089 A | * | 2/2000 | Parker et al. ................. | 36/136 |
| 6,079,144 A | * | 6/2000 | Morgan et al. .............. | 43/17.5 |
| 6,265,984 B1 | * | 7/2001 | Molinaroli ............... | 340/815.4 |

* cited by examiner

Primary Examiner—Charles T. Jordan
Assistant Examiner—Tara M Golba
(74) Attorney, Agent, or Firm—Wyatt, Tarrant & Combs, L.L.P.

(57) ABSTRACT

A fishing lure has a hollow body that contains a battery and a selected recipient device (eg. a light emitting device, horn, vibrator motor). A switch interrupts a circuit to deactivate the light emitting device (or other recipient device) when the lure body is moved from a generally horizontal, "swimming" position to a more inclined position. The apparatus has a rechargeable battery that can be charged by connecting to hook eyelets on the lure body.

15 Claims, 6 Drawing Sheets

FISHING LURE

CROSS-REFERENCE TO RELATED APPLICATIONS

Priority of U.S. Provisional Patent Application Ser. No. 60/256,785, filed Dec. 19, 2000, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to fishing lures, more particularly to battery powered fishing lures. Even more particularly, the present invention relates to an improved battery powered fishing lure that has a switch that closes a circuit to provide battery power for a selected "recipient", device such as a light emitting source, sound producing source or vibrating motor when the lure body is in a swimming position, for example, generally horizontally extended for a bait fish simulating lure body. The circuit is interrupted when the lure body is not in the swimming position, such as when the lure body is oriented generally vertically.

2. General Background of the Invention

Light or sound and/or vibration can-be used to attract a fish when fishing with an artificial lure retrieved by a rod, reel and line. One approach is to fish within a lighted area. Another approach is to fish with a lure that is illuminated. Several fishing lures that contain a light source have been patented. An example is U.S. Pat. No. 4,347,681 issued to Raoul Fima.

The LeRoy patent U.S. Pat. No. 4,669,213, issued Jun. 2, 1987 discloses a fishing lure that illuminates with electrically conductive eyelets providing a-means to recharge the cell.

A self propelled preprogrammable fishing lure is disclosed in U.S. Pat. No. 4,536,985.

The Livingston U.S. Pat. No. 5,157,857 discloses a fishing apparatus that includes an electronic device.

An electrified fishing lure is the subject of U.S. Pat. No. 5,159,773.

The Rodgers U.S. Pat. No. 5,330,282 discloses a fishing lure that contains a light source which can be turned off to on with a switch. Another Rodgers patent is U.S. Pat. No. 5,461,185.

Yet another Rodgers patent is U.S. Pat. No. 5,697,182.

The Yokogawa U.S. Pat. No. 6,029,388 discloses a light emitting fishing lure.

The Young U.S. Pat. No. 5,758,450 discloses a laser illuminated lure.

BRIEF SUMMARY OF THE INVENTION

The present invention provides a fishing lure that can be of any artificial lure type (eg. crank bait, worm, buzz bait, ratl-trap, hula-popper, minnow, shad or other selected lure type or related tackle). The apparatus is internally powered with its own battery or battery pack. This battery pack can operate with a selected internal "recipient" device, such as illumination device, sound effect device and/or motorized movement device.

The present invention powers a selected lure or other like artificial fishing tackle. The apparatus includes generally three components: a rechargeable power supply, a switch, and a selected "recipient" (eg. light source, horn, vibrator).

A motion sensor can also be a "recipient", thereby guarding the battery from uncontrollable discharge. This energy saving feature greatly increases fishing time when fishing style requires extended time periods while the lure is submerged in the water. Power supply is more than ample for any desired or known effect "recipient" under normal casting styles of fishing.

The lure of the present invention swims when retrieved by a rod, reel, and line to cause to a provided switch to activate to a positive(+) power feed on position. A switch housing or cylinder is positioned very near to, perpendicular to water level when the battery is switched "on" to power a selected "recipient" device (eg. light, horn, vibrator motor).

Magnetic lay-in current stabilizers can be placed on the switch's four quadrants, where contact with the ball bearing establish the "on" and "charging/resting" positions that are optimum or perpendicular to water and 180 degrees from each other.

The metal ball bearing in the switch housing cylinder rests solidly, with its full weight on the magnetic contacts, continuing positive (+) current flow to the recipient device during lure retrieval. This assures smooth current flow during cast retrieval and also during recharging. Once the cast is retrieved and the lure is pulled from the water, the lure comes to the "Hanging On Line" position at end of rod. The ball bearing falls free, off the contacts and "recipient" (light source, horn, vibrator motor) now cannot be positively charged and "resetting" occurs.

By design, the lure turns on and off, while in use or while fishing, conserving valuable battery drain and extends life. Overheating or undesirable current flow are also eliminated.

The rear hook eyelet feeds only the rechargeable battery's positive post. The front (lower) hook eyelet is the ground or the negative for every component of the system.

The charging position (See FIGS. 10–11) exists only when the lure is placed in the designated slot in the designed recharging apparatus. The "easy clips" can now knowingly be attached to the hook eyes and recharge the battery cells. This position is "resting/charging position" and the housing of the "switch" is again at or near perpendicular to the water level. but the ball bearing rests solidly on the magnetic contacts for the recharging circuit (as opposed to the contacts for the light circuit) effecting a continuing positive (+) current flow from the rear hook eyelet to the positive connection of the sealed battery unit.

The purpose of the present invention is to supply fishermen with their desire of all fishing lures, or other tackle that achieve two major accomplishments of the design: the rechargeable power supply and control of that power supply. Given this, the fisherman is asked to only choose what technology he wants in his desired lure/tackle. That desired recipient or his chosen technology is put with our invention and implemented into desired lure/tackle. The fisherman has to do nothing else but fish with his lure, as he would fish with any other lure.

The fisherman's act of fishing will operate the present invention of switching power back and forth between "on" and "off" positions. Once power supply is depleted the user must only then position his or her lure/tackle in the provided charging apparatus and connect the hook eyelets to the provided easy clips.

The present invention enables a fisherman to incorporate his or her choice of vehicle (lure body) and recipient device (eg. light, horn, vibrator motor).

The parameters of that equation are the application of one or more of the following; all available and all to be created effects of microchip technology which operate with 3.6 volts or less and the fisherman's desire for his chosen effect(s), and all fishing lures/tackle physically capable of receiving the power source, the gravity switch and that desired effect. This establishes one of the true values of this invention; that the invention incorporates the desires of the fisherman.

Water, heat and gravity are forces at work out of our control. It can be attempted to overcome the forces to design a system but that is not the purpose of this design. The design of this invention does exactly the opposite. Until the forces are embraced and implemented into the design, the design will fail one goal or another. The achievement of this invention is its use of these forces to reach all our goals. Physics must be applied. Fishing and resulting forces of fishing set the parameters in which any design must operate successfully. This invention can only function properly inside these unchangeable parameters.

The parameters are the range of motion set forth by fishing. That is casting a lure into the water and retrieving the lure to the rod and repetition of that cycle.

The present invention provides an improved fishing lure that includes a lure body that simulates a swimming aquatic animal when the lure body is pulled through the water in an upright, swimming position.

The lure body has a light emitting device that illuminates at least a portion of the lure body. A battery powers the light emitting device.

A switch is interconnected between the battery and the light emitting device, the switch deactivating the light emitting device when the lure body is reoriented so that it is not in the upright, swimming position.

In the preferred embodiment, the switch includes a moving contact member that shifts position when the lure body is reoriented so that it is not in an upright, swimming position.

The switch can include a motion sensor that shuts off battery power to the light emitting device when a switch member generates motion that is sensed by the motion sensor.

The light emitting member can be a light emitting diode.

The light emitting member can be a laser.

The light emitting member can be an incandescent bulb.

The lure body can be hollow, and the light emitting member and battery contained within the hollow interior.

The lure body interior can also provide a switch element for switching electricity between the contained battery and the light emitting member.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figures 1, 2:
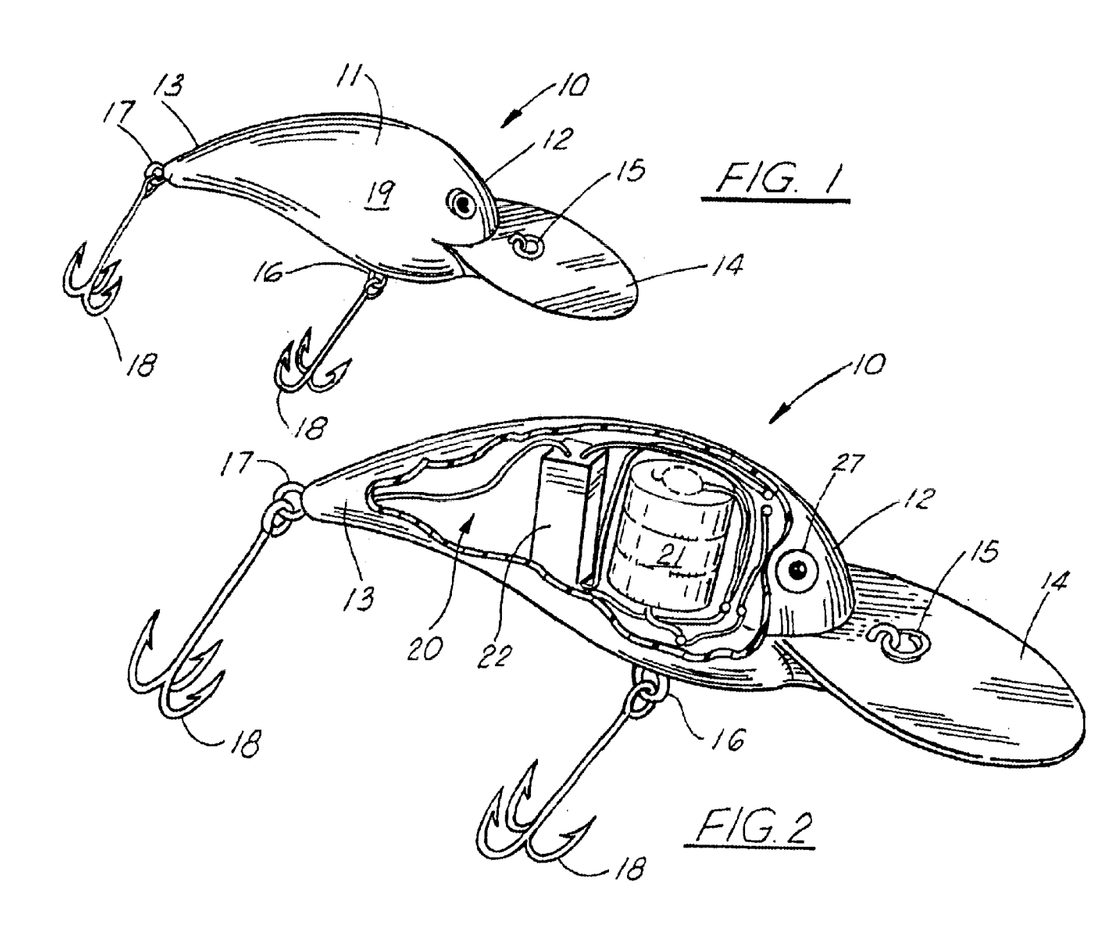
FIG. 1 is a perspective view of the preferred embodiment of the apparatus of the present invention.
FIG. 2 is a partially cutaway, perspective view showing the preferred embodiment of the apparatus of the present invention.
Figure 3:
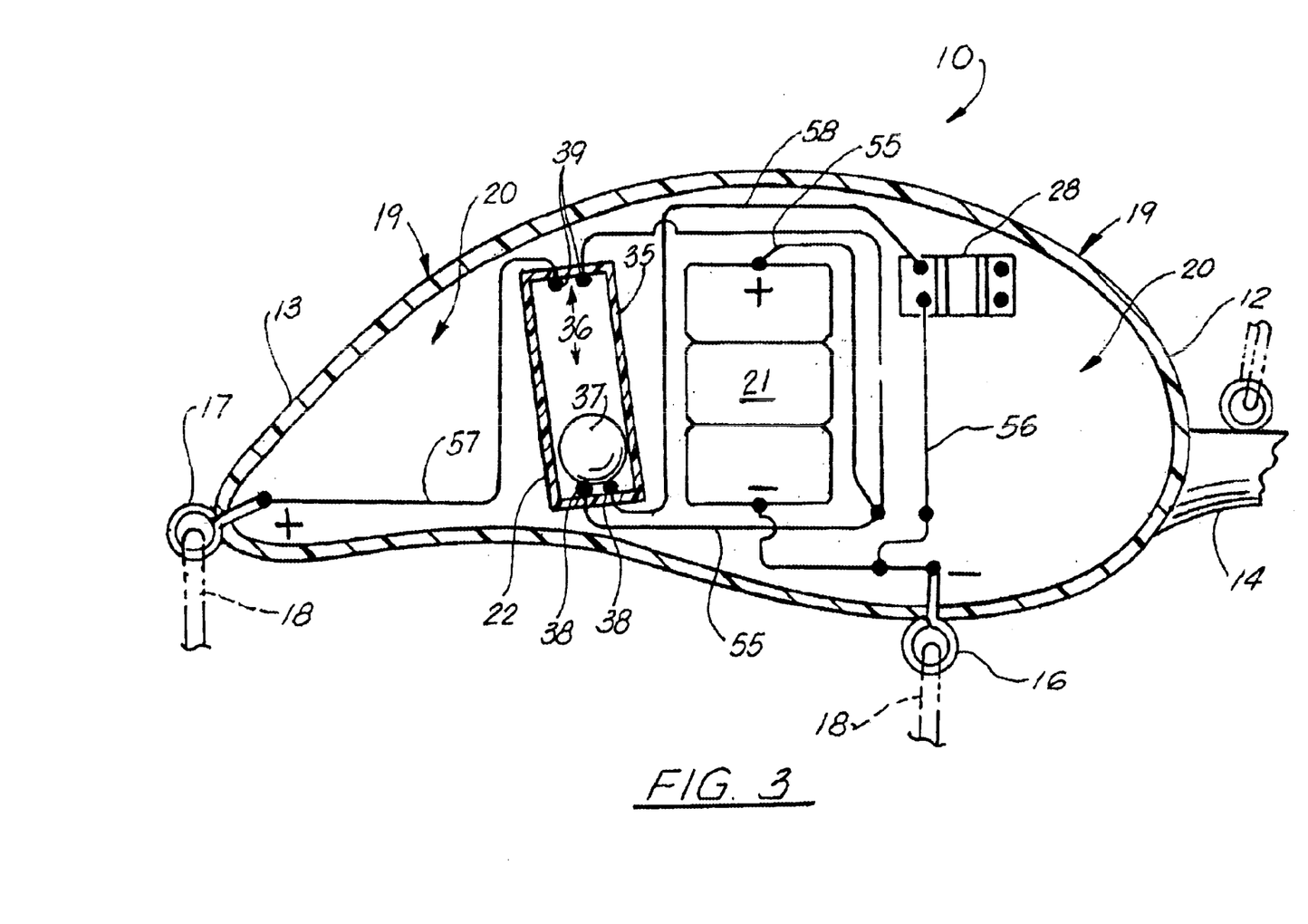
FIG. 3 is a sectional elevation view of the preferred embodiment of the apparatus of the present invention.

FIGS. 1–3 show the preferred embodiment of the apparatus of the present invention, designated generally by the numeral 10. Fishing lure 10 has a body 11 with front 12 and rear 13 portions. The front 12 portion of body 11 can optionally be equipped with a diving blade 14. A line eyelet 15 can be provided on the body 11 at the front 12 portion of the body, or be attached to the diving-blade as shown in FIGS. 1, 2 and 3.

Figure 6:
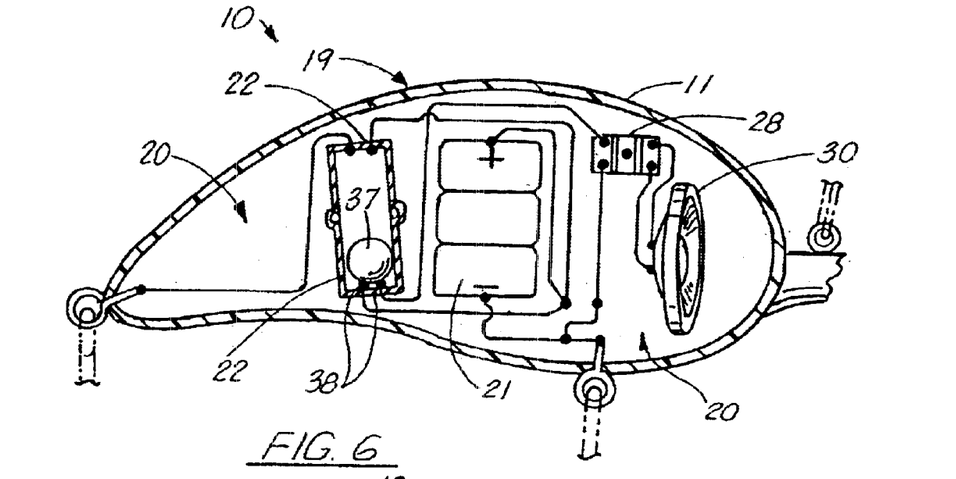
FIG. 6 is a sectional elevation view of the preferred embodiment of the apparatus of the present invention showing use of a sound emitting device as part of the fishing lure.
Figures 7, 7A:
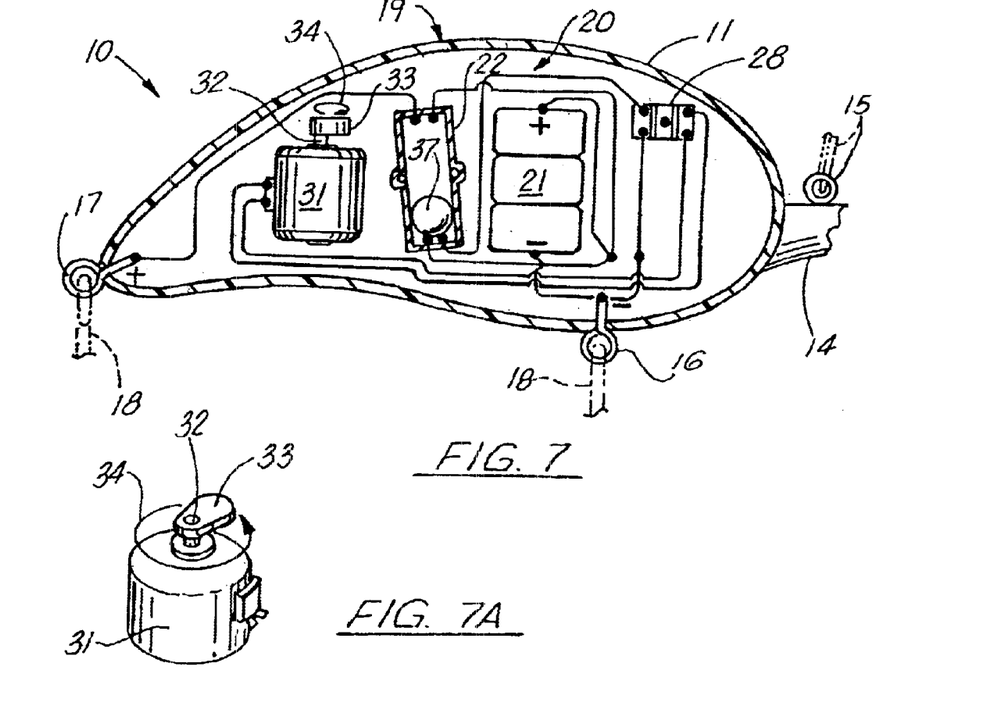
FIG. 7 is a sectional elevation view of the preferred embodiment of the apparatus of the present invention showing a vibration inducing device as part of the apparatus.
FIG. 7A is a fragmentary view illustrating the vibrating device of FIG. 7.

The body 11 preferably provides a pair of hook eyelets 16, 17. These hook eyelets 16, 17 not only enable hooks 18 to be carried by the body 11, the hook eyelets 16, 17 also enable the apparatus 10 to be recharged after its internal battery 21 has lost its charge (see FIGS. 10–11). The battery will lose charge after lengthy use of the device during fishing. The forward hook eyelet 16 can carry a single, double or treble hook arrangement, a treble hook 18 being shown in FIG. 2. Likewise, the rear hook eyelet 17 can carry a single, double or treble hook arrangement, a treble hook being shown in FIGS. 1 and 2. In FIG. 3, the core of electrical components shown include a switch 22 having lower contacts 38 (one positive, one negative) and upper contacts 39 (one positive, one negative), battery 21 wiring 55, 56, 57, 58 and circuit board 28. A positive leaf 55 extends from the positive terminal of battery pack 21. A negative lead 56 extends from the negative terminal of battery 21 as shown in FIG. 3. Negative wire lead 56 communicates with forward hook 16 and with circuit board 28. Positive wire lead 57 communicates between one of the upper contacts 39 of switch 22 and the rear hook 17 as shown in FIG. 3. A positive lead 58 extends between one of the lower contacts 38, namely the positive contact and circuit board 28. A desire "recipient" can then be connected to the circuit board 28 as shown in FIGS. 4, 6, and 7.

The hook eyelet 16, 17 provide contacts that enable the battery pack 21 to be recharged. Body 11 has an outer surface 19 that can be covered with a simulated bait fish pattern that can include scales, coloration, gills, eyes 27 or the like.

Body cavity 20 has a core of components that include. wiring (see FIG. 3), battery pack 21 and switch 22. Body cavity 21 can also carry a. "recipient" device and an interfacing circuit board 28. The "recipient" device can be a light source 29, horn 30, or motor drive 31 having a shaft 32 with an eccentric weight 33 for producing vibration (see FIGS. 4–5, 6, 7, 7A) . In this fashion, the apparatus 10, 10A of the present invention can be used as a fishing lure which is illuminated, having an internal light source 29 as shown in FIG. 4. The lure 10, 10A of the present invention can provide an internal sound producing horn 30 or a vibrating motor when equipped with motor 31, shaft 32 and eccentric weight 33.

Figures 4, 5:
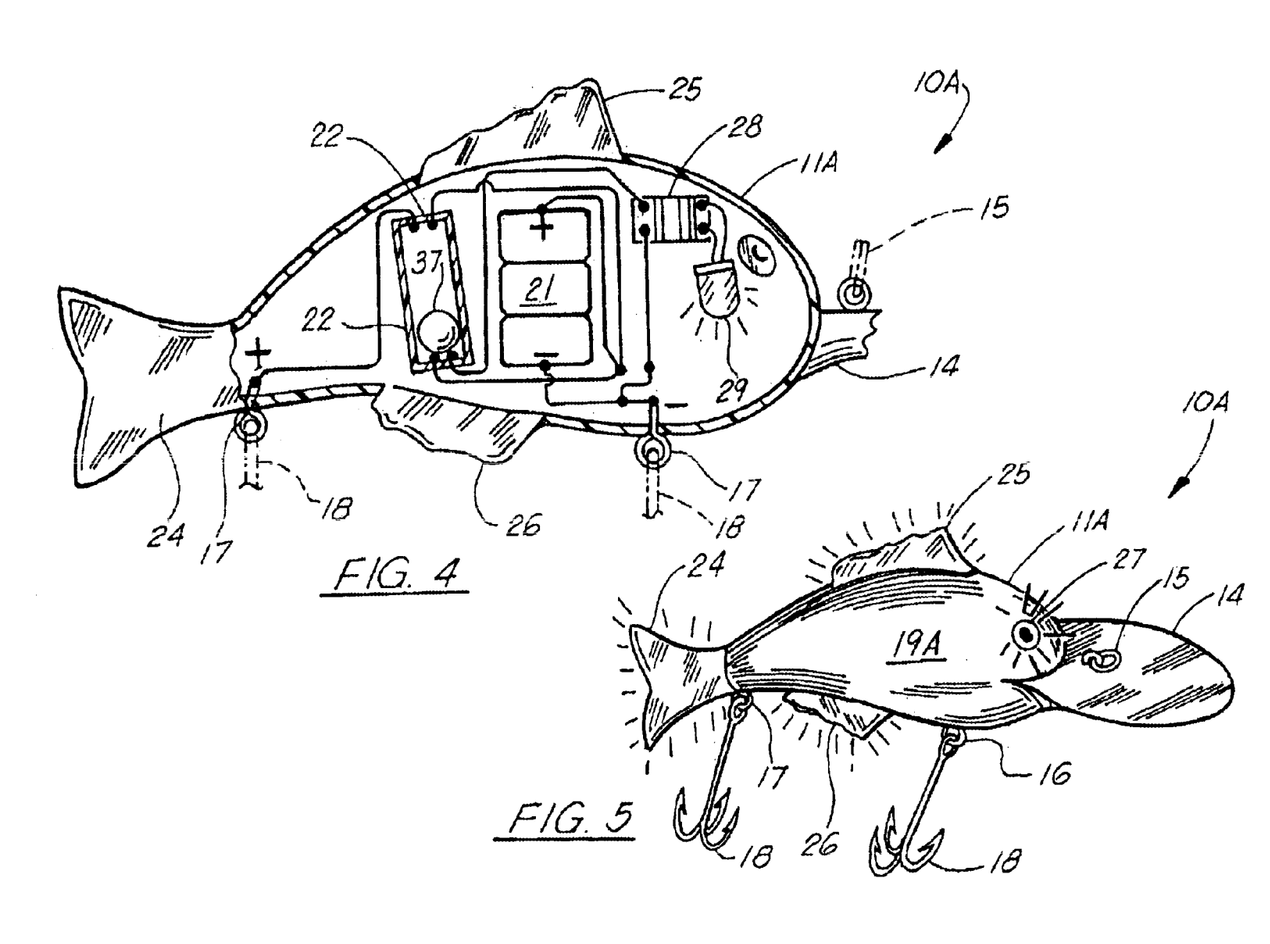
FIG. 4 is a sectional elevation view and an alternate embodiment of the apparatus of the present invention.
FIG. 5 is perspective view of the alternate embodiment of the apparatus of the present invention.

An alternate construction is shown in FIGS. 4 and 5, designated generally by the numeral 10A. The same basic core of electrical components of FIG. 3 can be used for the embodiment designated as 10A. As with the preferred embodiment, the alternate embodiment 10A includes a body 11A having a body cavity 20 and an outer surface 19A. In FIGS. 4 and 5, the fishing lure 10A provides a plurality of illuminated structures that can include for example, tail 24, fins 25, 26 and eye 27. In the embodiment of FIGS. 4 and 5, the body 20 outer surface 19A would preferably be painted or otherwise covered with opaque material. The fins 25, 26 and tail 24 would be of a translucent or transparent material that would light up when the device 10A is operated. Similarly, the eye 27 or other selected structure could be clear or translucent so that it would be illuminated when light source 29 is activated during use.

Figure 8:
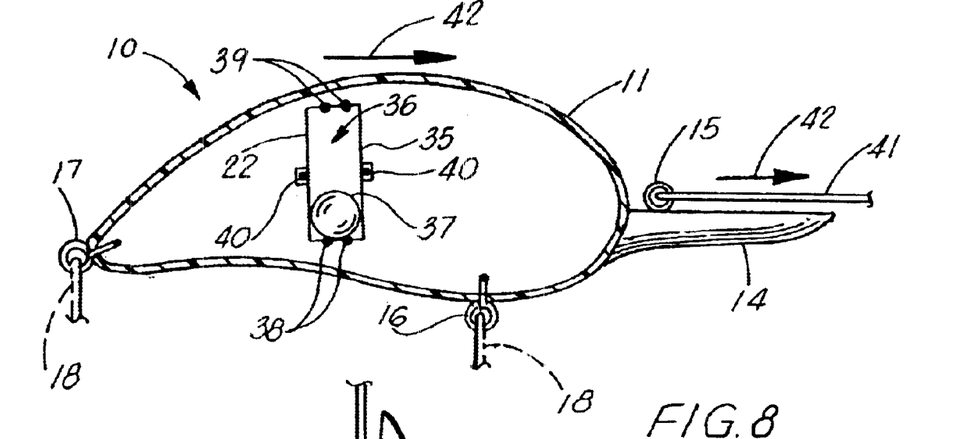
FIG. 8 is a partial sectional elevation view of the preferred embodiment of the apparatus of the present invention showing the body and switch portions in an operating, retrieval position.
Figure 9:
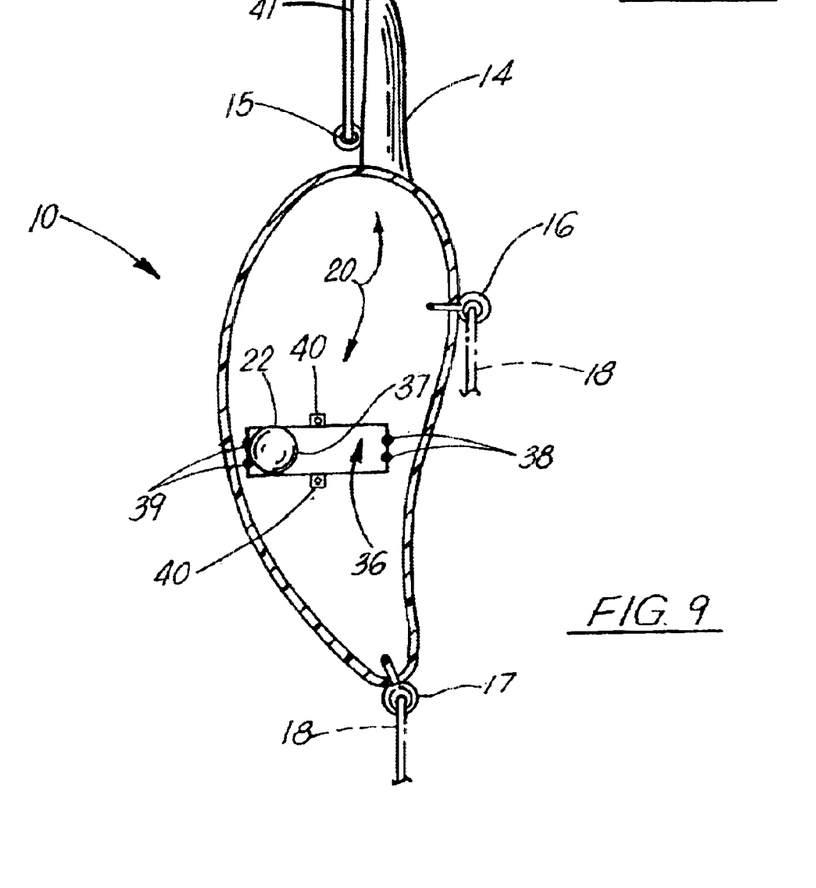
FIG. 9 is a partial sectional elevation view of the preferred embodiment of the apparatus of the present invention showing the lure in a vertical, rod racked resting position.

In order to operate the apparatus 10 or 10A of the present invention, a fishing line 41 that is typically part of a rod and reel has a free end that is attached to line eyelet 15 as shown in FIGS. 8 and 9. The fishing, retrieval position is shown in FIG. 8. A fisherman casts the lure 10 in the direction of a selected body of water and then uses the rod and reel to retrieve the lure 10 in the direction of arrows 42 in FIG. 8. When the user retrieves the lure 10 in the direction of arrows 42, the body 11 is oriented generally horizontally as shown in FIG. 8 which generally vertically orients switch 22. This operating, swimming position of the lure 10 is also shown in FIGS. 1–7.

In FIG. 8, the components other than switch 22 have been removed from body cavity 20 for purposes of clarity. In the position shown in FIGS. 1–8, switch 22 provides a switch housing 35 having an interior 36. Metal ball bearing 37 falls to the bottom of switch housing 35, resting upon contacts 38 and closing a circuit that activates the selected "recipient" device that can be a light source 29, sound producing device (eg. horn 30), or vibrator motor 31.

In FIG. 9, a racked position of the fisherman's rod and reel is shown. In this position, the lure 10 or 10A is typically affixed to a portion of the fishing rod and the rod is stored generally vertically in a rod rack on the fisherman's boat. This same position is achieved when the rod is held by the user in a generally vertical position. In this position, the ball bearing 37 rolls to the upper end of switch housing 22, passing next to motion sensors 40. When this occurs, power to the selected "recipient" such as light source 29 is interrupted so that the battery 21 is conserved. The battery 21 is only supplying power to the selected recipient (such as light source 29) when the lure 10 or 10A is in the swimming position of FIG. 8. Likewise, if a horn 30 (FIG. 6) is to be activated, activation only occurs when in the swimming position of FIG. 6, wherein metal ball bearing 37 rests upon the lower contacts 38. Similarly, in FIGS. 7 and 7A, when metal ball bearing 37 rests upon lower contacts 38, battery 21 supplies power to motor drive 31 for rotating shaft 32 and eccentric weight 33 which rotates as indicated by the arrow 34 in FIGS. 7 and 7A. Because the weight 33 is eccentric, it produces a vibrating action which enhances the simulation of a swimming bait fish.

Figure 10:
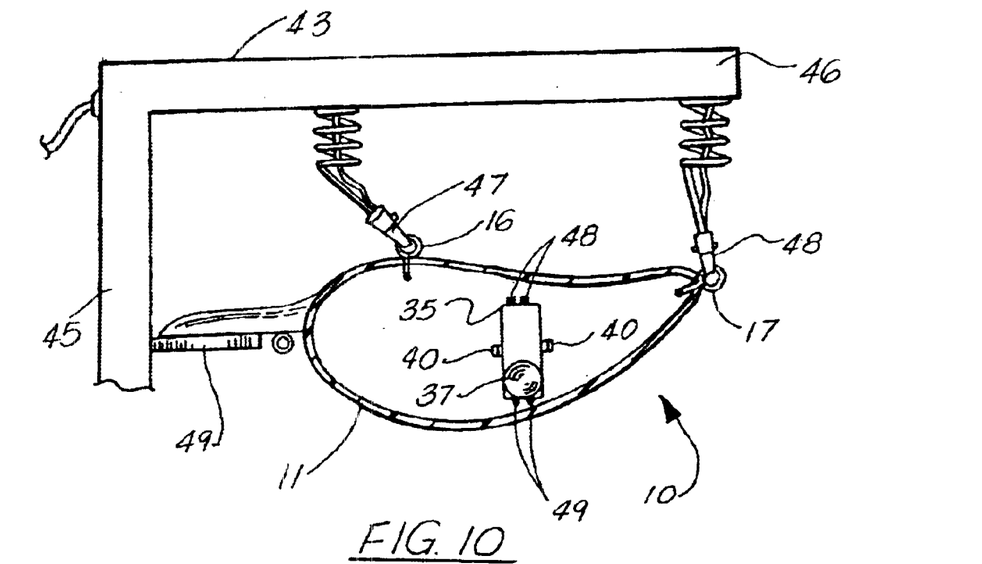
FIG. 10 is a partial elevation view of the charger that is used to recharge the battery portion of the apparatus of the present invention.
Figure 11:
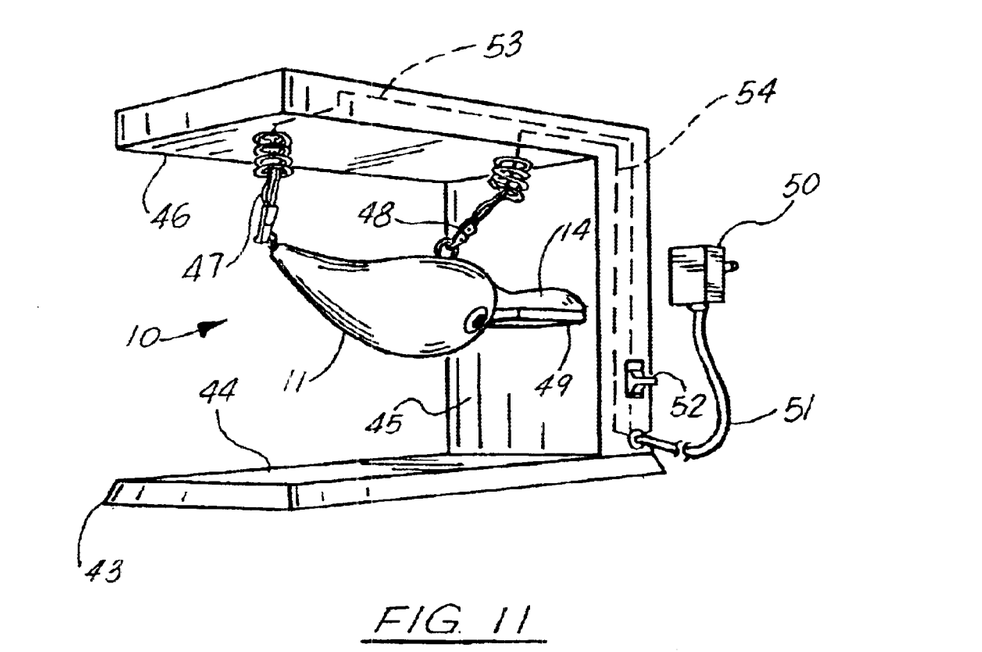
FIG. 11 is a perspective view illustrating the charger that can be used to recharge. the battery of the apparatus of the present invention.

A charger for recharging battery 21 is shown in FIGS. 10 and 11. Charger 43 can includes a base 44 that supports a pair of sections 45, 46 connected together including vertical section 45 and upper horizontal section 46. The combination of base 44, vertical section 45 and upper horizontal section 46 provides a structure that can support the lure 10, 10A during charging of the battery 11. In the charging position, the lure body 11 is inverted, as shown in FIGS. 10 and 11. By inverting the lure body 11, metal ball bearing 37 engages contacts 39 for closing a circuit that enables charging of the battery pack 21. In order to charge the battery pack 21, a transformer 50 is provided having a power cord 51 that communicates with wires 53, 54. The wire 53 is a positively charged wire for communicating with eyelet 17 via clip 47. The wire 54 is a negatively charged wire that communicates with eyelet 17 via clip 48. The clips 47, 48 can be alligator type clips that both convey power to battery pack 21 via eyelets 16, 17 and also grip and hold the lure body 11 in the inverted position of FIGS. 10 and 11. In order to further support the lure body 11 in the inverted position, a diving blade holder 49 can be provided that extends from vertical section 45 in a generally horizontal direction as shown in FIGS. 10 and 11.

The charger 43 can be activated by using switch 52 after the lure 10 is in the selected position shown in FIGS. 10 and 11.

| PARTS LIST | |
|---|---|
| PART NO. | DESCRIPTION |
| 10 | fishing lure |
| 10A | fishing lure |
| 11 | body |
| 11A | body |
| 12 | front |
| 13 | rear |
| 14 | diving blade |
| 15 | line eyelet |
| 16 | forward hook eyelet |
| 17 | rear hook eyelet |
| 18 | hook |
| 19 | outer surface |
| 19A | outer surface |
| 20 | body cavity |
| 21 | battery pack |
| 22 | switch |
| 23 | recipient device |
| 24 | tail |
| 25 | dorsal fin |
| 26 | fin |
| 27 | eye |
| 28 | circuit board |
| 29 | light source |
| 30 | horn |
| 31 | motor |
| 32 | shaft |
| 33 | eccentric weight |
| 34 | arrow |
| 35 | switch housing |

-continued

PARTS LIST

| PART NO. | DESCRIPTION |
|---|---|
| 36 | switch interior |
| 37 | metal ball |
| 38 | lower contacts |
| 39 | upper contacts |
| 40 | motion detector |
| 41 | fishing line |
| 42 | direction of retrieval |
| 43 | charger |
| 44 | base |
| 45 | vertical section |
| 46 | upper horizontal section |
| 47 | charger clip |
| 48 | charger clip |
| 49 | diving blade holder |
| 50 | transformer |
| 51 | power cord |
| 52 | switch |
| 53 | wire |
| 54 | wire |
| 55 | wire |
| 56 | wire |
| 57 | wire |
| 58 | wire |

The foregoing embodiments are presented by way of example only; the scope of the present invention is to be limited only by the following claims.

What is claimed is:

1. A fishing lure, comprising:
 a) a lure body that simulates a swimming aquatic animal when the lure is pulled through the water in an upright swimming position;
 b) the lure body having a light emitting device that illuminates at least a portion of the body;
 c) a battery and circuit for selectively powering the light emitting device;
 d) a recharging circuit for selectively connecting the battery to a recharger; and
 e) a switch for alternatively interconnecting the battery and light emitting device and the battery and recharging circuit that activates the light to be on when the lure is in the upright swimming position and deactivates the light emitting device and connects the battery to the recharging circuit when the lure body is reoriented so that it is not in the upright swimming position.

2. The fishing lure of claim 1 wherein the switch includes a moving contact member that shifts position when the lure body is reoriented so that it is not in the upright, swimming position.

3. The fishing lure of claim 1 wherein the switch includes a motion sensor that shuts off battery power to the light emitting device.

4. The fishing lure of claim 1 wherein the light emitting member is a light emitting diode.

5. The fishing lure of claim 1 wherein the light emitting member is a laser.

6. The fishing lure of claim 1 wherein the light emitting member is an incandescent bulb.

7. The fishing lure of claim 1 wherein the lure body has a hollow interior and the light emitting device and battery are contained within the hollow interior.

8. The fishing lure of claim 1 wherein the switch is comprised of a switch housing having a hollowed area that carries a moving switch element.

9. The fishing lure of claim 1 wherein the switch element is a metallic member.

10. A fishing lure, comprising:
 a) a lure body that simulates a swimming aquatic animal when the lure is pulled through the water in an upright swimming position;
 b) the body having a light emitting device that illuminates at least a portion of the body;
 c) a battery circuit that includes a battery and the light emitting device;
 d) a battery recharging circuit including the battery and adapted to be connected to a battery charger; and
 e) switch means in the battery circuit for disconnecting the light emitting device and connecting the battery recharging circuit when the lure is not in the upright swimming position.

11. The fishing lure of claim 10 wherein the lure body assumes a generally horizontal position when in the upright, swimming position.

12. The fishing lure of claim 10 wherein the switch means includes a switch housing that contains a moving switch member, the moving switch being movable to alternately connect the battery to the light emitting device and the battery recharging circuit.

13. The fishing lure of claim 10 wherein the switch means includes a switch housing which includes a motion detector that detects movement of a moving member contained within the switch housing.

14. The fishing lure of claim 13 wherein the switch housing has first and second end portions and the motion detector is positioned in between the housing end portions.

15. The fishing lure of claim 10 wherein the switch means is comprised of a switch housing, a moving member contained within the housing, the housing having a seat for receiving the moving member that defines a closed circuit position so that when the member registers upon the seat, the battery supplies electricity to the light emitting device.

* * * * *

UNITED STATES PATENT AND TRADEMARK OFFICE
CERTIFICATE OF CORRECTION

PATENT NO. : 6,647,659 B1
APPLICATION NO. : 10/029452
DATED : November 18, 2003
INVENTOR(S) : King et al.

It is certified that error appears in the above-identified patent and that said Letters Patent is hereby corrected as shown below:

On title page

Item (73) Assignee misspelled "Takle" should read --Tackle--

Signed and Sealed this

Twentieth Day of March, 2007

JON W. DUDAS
*Director of the United States Patent and Trademark Office*